(12) United States Patent
Sakakibara et al.

(10) Patent No.: US 10,161,546 B2
(45) Date of Patent: Dec. 25, 2018

(54) DUCT AND METHOD OF MANUFACTURING THE SAME

(71) Applicants: INOAC CORPORATION, Nagoya-shi, Aichi-ken (JP); TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Makoto Sakakibara, Anjo (JP); Masahito Yabuoshi, Chiryu (JP); Kengo Nakamura, Fukuoka (JP); Shinji Yamamoto, Munakata (JP); Hiromi Nakano, Toyota (JP)

(73) Assignees: INOAC CORPORATION, Nagoya (JP); TOYOTA JIDOSHA KABUSHIKI KAISHA, Toyota (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 56 days.

(21) Appl. No.: 15/292,788

(22) Filed: Oct. 13, 2016

(65) Prior Publication Data

US 2017/0122466 A1 May 4, 2017

(30) Foreign Application Priority Data

Nov. 4, 2015 (JP) ................... 2015-216477

(51) Int. Cl.
*F16L 9/21* (2006.01)
*B21D 26/033* (2011.01)
(Continued)

(52) U.S. Cl.
CPC .............. *F16L 9/21* (2013.01); *B21D 26/033* (2013.01); *B60H 1/00564* (2013.01);
(Continued)

(58) Field of Classification Search
CPC .......... F16L 9/21; F16L 9/003; B21D 26/033; B60H 1/00; F24F 13/0263; F24F 13/24
(Continued)

(56) References Cited

U.S. PATENT DOCUMENTS 4,874,649 A * 10/1989 Daubenbuchel ........ B29C 49/22
428/36.5
6,053,215 A * 4/2000 Sadr ........................ B29C 49/24
138/178

(Continued)

FOREIGN PATENT DOCUMENTS

JP 2001-124394 A 5/2001
JP 2001-213136 A 8/2001
(Continued)

OTHER PUBLICATIONS

Jul. 4, 2018 Office Action issued in Chinese Patent Application No. 201610887407.X.

*Primary Examiner* — Eric Keasel
*Assistant Examiner* — David Deal
(74) *Attorney, Agent, or Firm* — Oliff PLC

(57) ABSTRACT

A duct of the present invention includes a pair of groove-shaped members which are formed of sound absorbing sheets and a pair of flange portions which are formed of parts of the pair of groove-shaped members that are extended outward from groove opening edges and which are joined in an overlaid state on each other when the pair of groove-shaped members are arranged such that groove openings are opposed to each other. The pair of flange portions includes a seal portion which is formed by crimping the sound absorbing sheets in parts of the flange portions along the groove opening edges and an outer thick portion which is
(Continued)

extended outward from the seal portion and which is formed of the sound absorbing sheet thicker than the sound absorbing sheet of the seal portion.

10 Claims, 15 Drawing Sheets

(51) Int. Cl.
*F16L 9/00* (2006.01)
*F24F 13/02* (2006.01)
*F24F 13/24* (2006.01)
*B60H 1/00* (2006.01)
*F16L 43/00* (2006.01)

(52) U.S. Cl.
CPC .......... *F16L 9/003* (2013.01); *F24F 13/0263* (2013.01); *F24F 13/24* (2013.01); *F16L 43/00* (2013.01); *F24F 2013/242* (2013.01)

(58) Field of Classification Search
USPC .................... 138/149, 156, 170, 171, DIG. 4
See application file for complete search history.

(56) References Cited

U.S. PATENT DOCUMENTS

| | | | | |
|---|---|---|---|---|
| 6,179,009 | B1* | 1/2001 | Fukui | F16L 9/21 138/129 |
| 6,309,721 | B1* | 10/2001 | Gladfelter | B60R 13/08 428/298.1 |
| 7,234,763 | B2* | 6/2007 | Gupta | B60N 2/3013 296/193.02 |
| 2002/0145309 | A1* | 10/2002 | Shikata | B60H 1/00528 296/208 |
| 2004/0108744 | A1* | 6/2004 | Scheib | B62D 25/142 296/70 |
| 2013/0052377 | A1* | 2/2013 | Tani | F02M 35/10334 428/34.1 |

FOREIGN PATENT DOCUMENTS

| | | |
|---|---|---|
| JP | 2002-087045 A | 3/2002 |
| JP | 2002-144845 A | 5/2002 |
| JP | 2003-326941 A | 11/2003 |
| JP | 2011-075121 A | 4/2011 |
| JP | 2014-065382 A | 4/2014 |

* cited by examiner

DUCT AND METHOD OF MANUFACTURING THE SAME

BACKGROUND OF THE INVENTION

Field of the Invention

The present invention relates to a duct that has a sound absorbing function and a method of manufacturing the same.

Description of the Related Art

Conventionally, as this type of a duct, a duct is known in which a pair of groove-shaped members formed of a sound absorbing sheet is arranged such that groove openings are opposed to each other and in which a pair of flange portions extended outward from the groove opening edges of the pair of groove-shaped members is crimped and joined (see, for example, Patent Literature 1). Such a duct can be obtained by overlaying a pair of sound absorbing sheets, crimping the outer edge portions of the pair of sound absorbing sheets, and vacuum molding or pressure molding each of the sound absorbing sheets into a groove shape.

CITATION LIST

Patent Literature

Patent Literature 1: Japanese Unexamined Patent Application Publication No. 2014-65382 (paragraph [0024] and FIGS. 1 to 4)

SUMMARY OF THE INVENTION

Problem to be Solved by the Invention

However, since the sound absorbing sheet is compressed during crimping of the flange portions and vacuum molding, the original sound absorbing performance of the sound absorbing sheet is degraded in the conventional duct described above. Therefore, it is difficult to enhance the sound absorbing performance of the duct.

An object of the present invention is to provide a duct that can enhance sound absorbing performance and a method of manufacturing the same.

Means for Solving the Problem

A duct according to the present invention that is designed to achieve the above object includes a pair of groove-shaped members which are formed of sound absorbing sheets and a pair of flange portions which are formed of parts of the pair of groove-shaped members extended outward from groove opening edges and which are joined while being overlaid on each other when the pair of groove-shaped members are arranged such that groove openings are opposed to each other. The pair of flange portions includes a seal portion which is formed by crimping the sound absorbing sheets in parts of the flange portions along the groove opening edges and an outer thick portion which is extended outward from the seal portion and which is formed of the sound absorbing sheet thicker than the sound absorbing sheet of the seal portion.

A method of manufacturing a duct according to the present invention further includes forming each of a pair of sound absorbing sheets obtained by overlaying the two sound absorbing sheets, by at least one of the molding methods of vacuum molding and pressure molding, into the shape of a groove so as to form a pair of groove-shaped members and joining a pair of flange portions which are extended outward from groove opening edges of the pair of groove-shaped members, where the joining of the pair of flange portions includes crimping the sound absorbing sheets in parts of the pair of flange portions along the groove opening edges so as to form a seal portion as a junction of the pair of flange portions and forming an outer thick portion which is extended outward from the seal portion and which is formed of the sound absorbing sheet thicker than the sound absorbing sheet of the seal portion, and the method of manufacturing a duct further includes trimming the pair of flange portions such that at least a part of the outer thick portion is left.

DESCRIPTION OF THE EMBODIMENTS

First Embodiment

Figure 1:
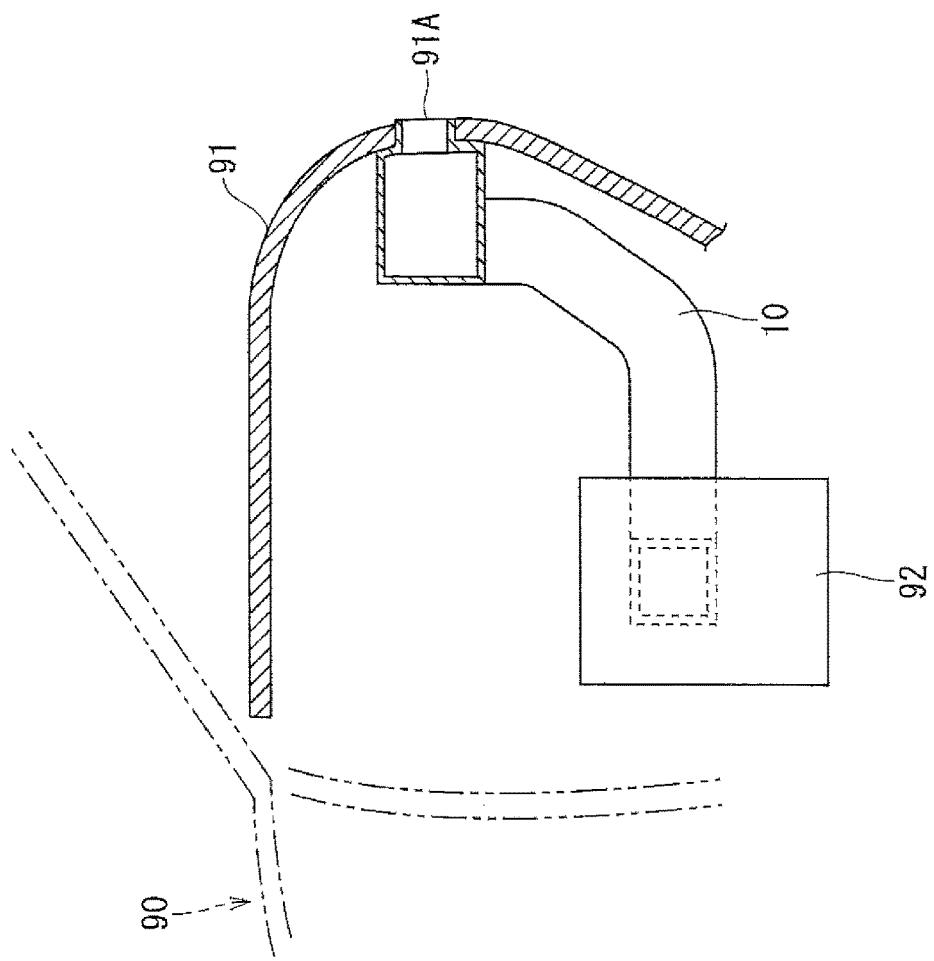
FIG. 1 is a schematic view showing a state in which a duct according to a first embodiment of the present invention is used.

A first embodiment of the present invention will be described below with reference to FIGS. 1 to 10. As shown in FIG. 1, a duct 10 according to the present embodiment is an air conditioning duct, and is arranged, for example, on the back side of an instrument panel 91 in a vehicle 90 and guides temperature-controlled air fed from an air conditioning unit 92 to an outlet 91A formed in the instrument panel 91.

Figure 2:
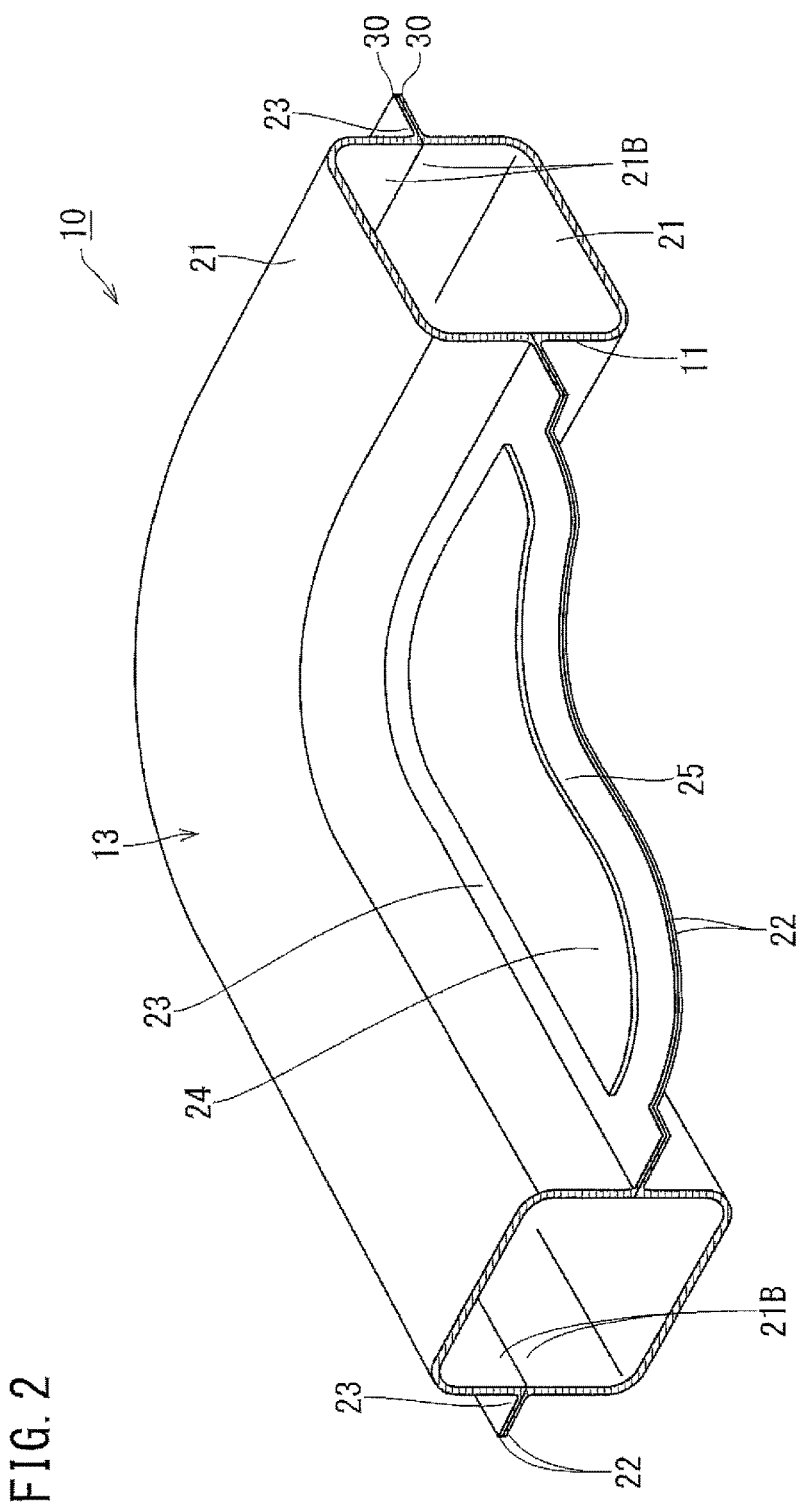
FIG. 2 is a partially broken perspective view of the duct.

FIG. 2 shows a portion of the duct 10 which is closely related to the present invention. As shown in the figure, the duct 10 is configured with a pair of groove-shaped members 21, formed of sound absorbing sheets 30. The pair of groove-shaped members 21, 21 are arranged such that groove openings 21A, 21A (see FIG. 4) are opposed to each other. The pair of groove-shaped members 21, 21 are joined in a state in which a pair of flange portions 22, 22 extended outward from groove opening edges 21B, 21B are overlaid, and are thereby formed into a tubular shape.

Figure 4:
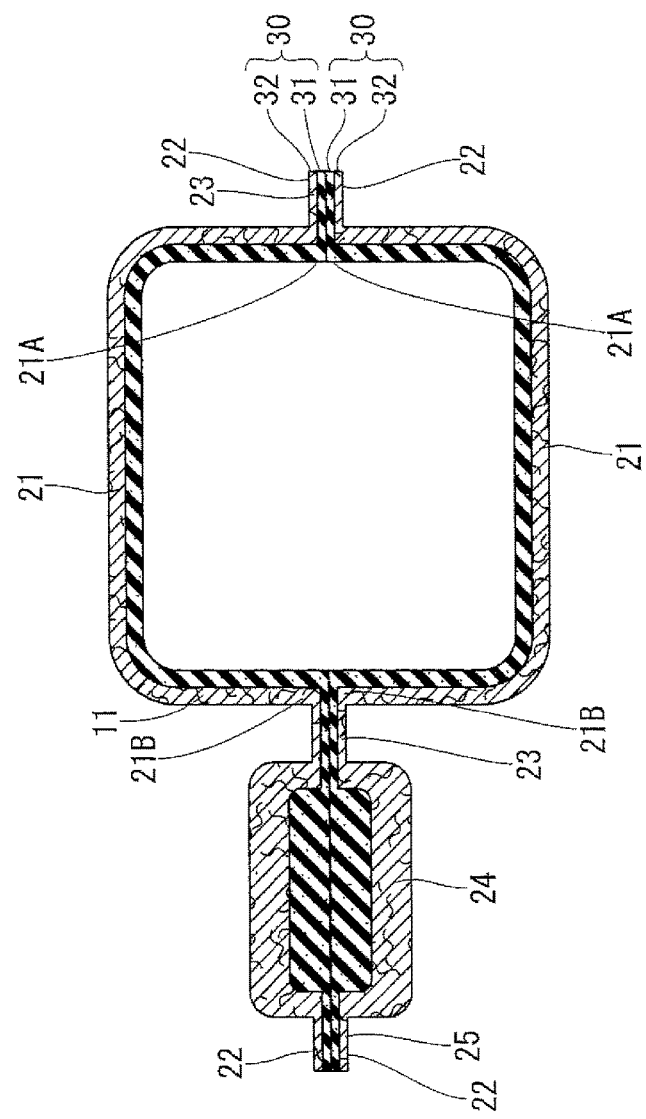
FIG. 4 is a cross-sectional view of the duct taken along line A-A.

As shown in FIGS. 2 and 4, the junction of the pair of flange portions 22, 22 is configured with a seal portion 23 which is formed by crimping the sound absorbing sheets 30, 30 in parts of the pair of the flange portions 22, 22 along the groove opening edge 21B of the groove-shaped member 21. The pair of flange portions 22, 22, is provided with an outer thick portion 24 extended outward from the seal portion 23 and formed of the sound absorbing sheet 30 being thicker than the sound absorbing sheet 30 of the seal portion 23. In the duct 10 of the present embodiment, the sound absorbing sheet 30 of a duct wall 11 is compressed in a thickness direction, and the sound absorbing sheet 30 of the outer thick portion 24 is thicker than the sound absorbing sheet 30 of the duct wall 11.

In addition, in the pair of flange portions 22, 22, an outer crimped portion 25 is provided which is formed by crimping the sound absorbing sheets 30, 30 along the outer edge portions of the flange portions 22. The outer thick portion 24 is sandwiched by the outer crimped portion 25 and the seal portion 23. The sound absorbing sheet 30 of the outer crimped portion 25 is substantially as thick as the sound absorbing sheet 30 of the seal portion 23.

Figure 3:
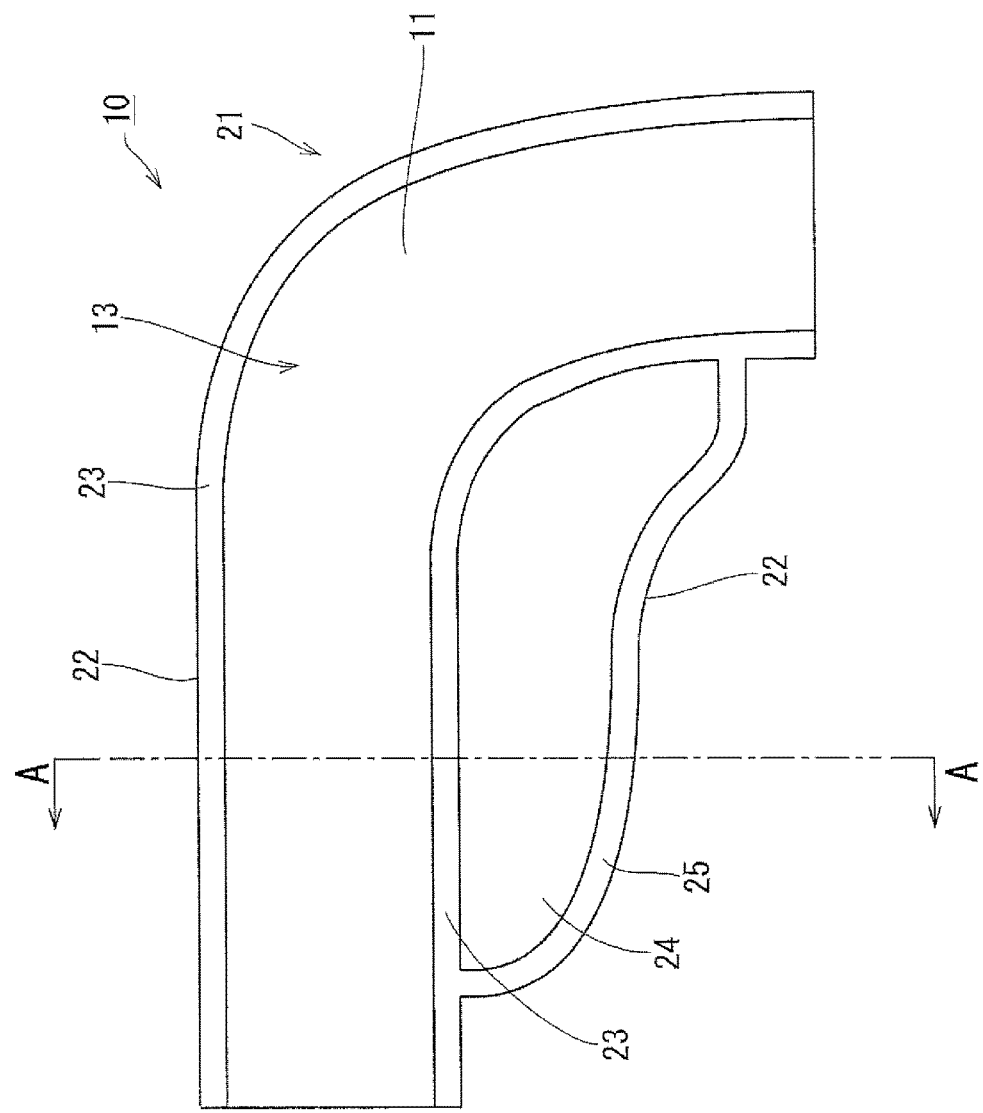
FIG. 3 is a plan view of the duct.

Here, as shown in FIGS. 2 and 3, in the present embodiment, the duct 10 is formed so as to have a corner portion 13 which is curved within a surface parallel to a junction surface of the pair of groove-shaped members 21, 21, and the outer thick portion 24 and the outer crimped portion 25 are formed in the pair of flange portions 22 which are arranged inside the corner portion 13. As described above, in the duct 10 of the present embodiment, the outer thick portion 24 and the outer crimped portion 25 which are arranged more externally than the seal portion 23 joining the pair of groove-shaped members 21, 21 are arranged inside the corner portion 13, and thus the duct 10 is made compact.

As shown in FIG. 4, the sound absorbing sheet 30 is configured with a laminated sheet including an closed-cell layer 31 formed of an closed-cell member and a non-woven fabric layer 32 formed of a non-woven fabric. The pair of sound absorbing sheets 30, 30 are arranged such that the closed-cell layers 31 face inward of the duct 10. Here, the closed-cell layer 31 is better in thermal insulation than the non-woven fabric layer 32, and the non-woven fabric layer 32 is better in sound absorption than the closed-cell layer 31. As described above, the laminated sheet including the closed-cell layer 31 and the non-woven fabric layer 32 is used as the sound absorbing sheet 30, in the duct 10 of the present embodiment, and thus both the thermal insulation and the sound absorption of the duct 10 are enhanced. As the closed-cell member of the closed-cell layer 31, a foam member of an olefin-based resin such as polyethylene or polypropylene, or a foam member of polyurethane is used. The non-woven fabric of the non-woven fabric layer 32 contains at least a thermoplastic resin fiber formed of a thermoplastic resin such as polyethylene, polypropylene or polyethylene terephthalate.

The configuration of the duct 10 according to the present embodiment has been described above. A method of manufacturing the duct 10 will then be described.

In order to manufacture the duct 10, two sound absorbing sheets 30 are first prepared. The sound absorbing sheet 30 is obtained by overlaying a foam member sheet formed of a closed-cell member and a non-woven fabric sheet formed of a non-woven fabric containing at least a thermoplastic resin fiber, and joining the sheets with a hot melt adhesive, or by thermal fusion bonding, etc., and thereby forming a laminated sheet. In the sound absorbing sheet 30, the foam member sheet forms the closed-cell layer 31, and the non-woven fabric sheet forms the non-woven fabric layer 32.

Figure 5:
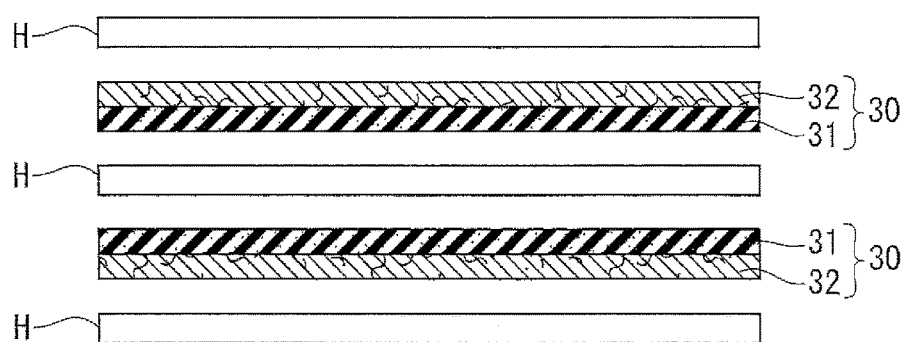
FIG. 5 is a cross-sectional view of sound absorbing sheets in a heating step.

After the preparation of the two sound absorbing sheets 30, 30, as shown in FIG. 5, the two sound absorbing sheets 30, 30 are supported apart in a state in which the closed-cell layers 31 are facing each other, and the sound absorbing sheet 30 is heated with a heater H from both sides of the closed-cell layer 31 and the non-woven fabric layer 32. Here, the non-woven fabric layer 32 is heated and softened to such an extent that its fibrous state is maintained and the closed-cell layer 31 is also softened. Consequently, the entire sound absorbing sheet 30 is brought into a softened state.

Figure 6:
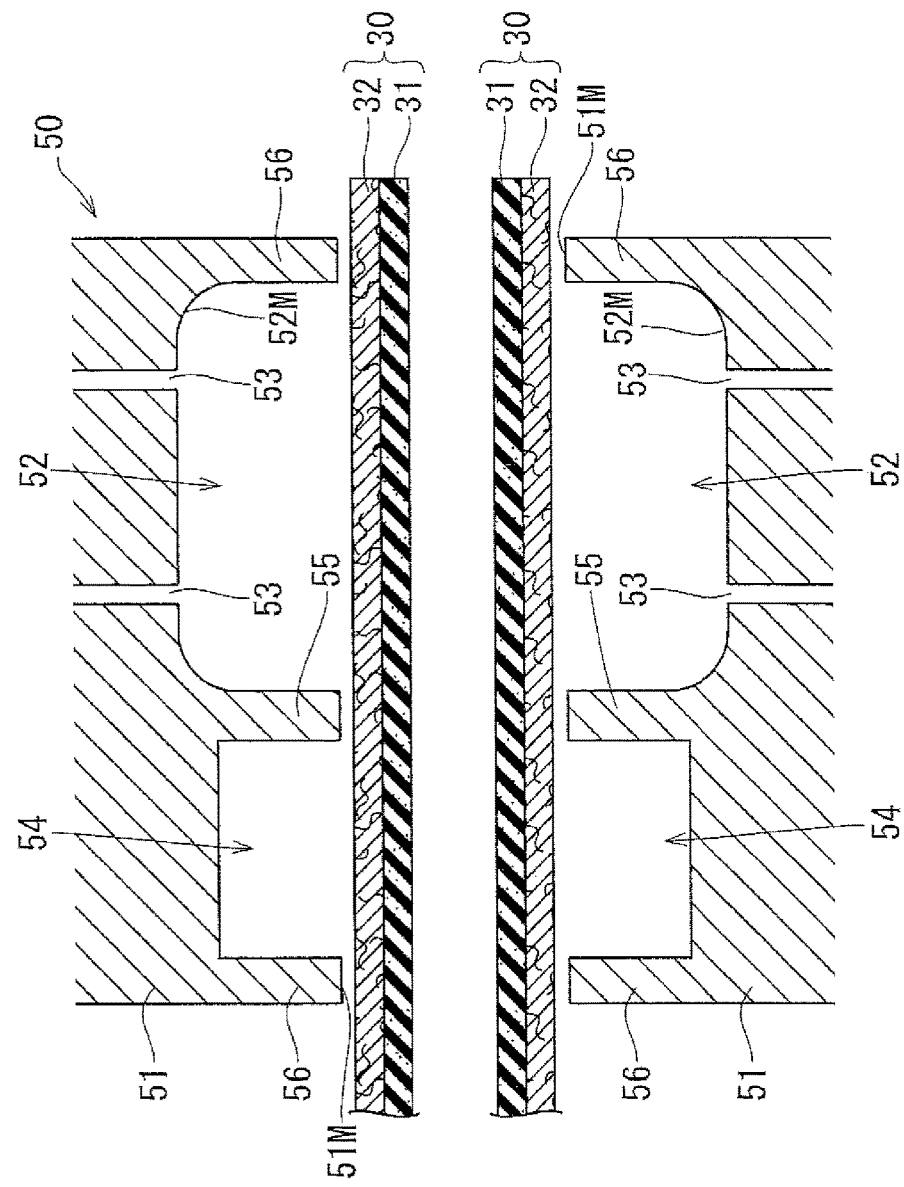
FIG. 6 is a cross-sectional view of the sound absorbing sheets which are set in a forming mold.

As shown in FIG. 6, the heated sound absorbing sheets 30, 30 are set in a forming mold 50 while maintaining the mutually facing state of the closed-cell layers 31. The forming mold 50 includes a pair of divided molds 51, 51 which contact with and separate from each other in the thickness direction of the sound absorbing sheet 30, 30. The pair of sound absorbing sheets 30, 30 is arranged between the pair of divided molds 51, 51. In the opposing faces 51M, 51M of the pair of divided molds 51, 51, first recess portions 52, 52 which are arranged opposed to each other are formed. In the inner surface of each of the first recess portions 52, a plurality of suction ports 53 for sucking air within the first recess portion 52 are formed. The inner surface of the first recess portion 52 serves as a molding surface 52M for molding the groove-shaped member 21 described above. In the opposing faces 51M, 51M of the pair of divided molds 51, 51, second recess portions 54, 54 which are arranged opposed to each other are formed separately from the first recess portions 52, 52. In each of the divided molds 51, an outer periphery protruding wall 56 which surrounds the first recess portion 52 and the second recess portion 54 from outside and a partition protruding wall 55 which partitions the first recess portion 52 and the second recess portion 54 are formed.

Figure 7:
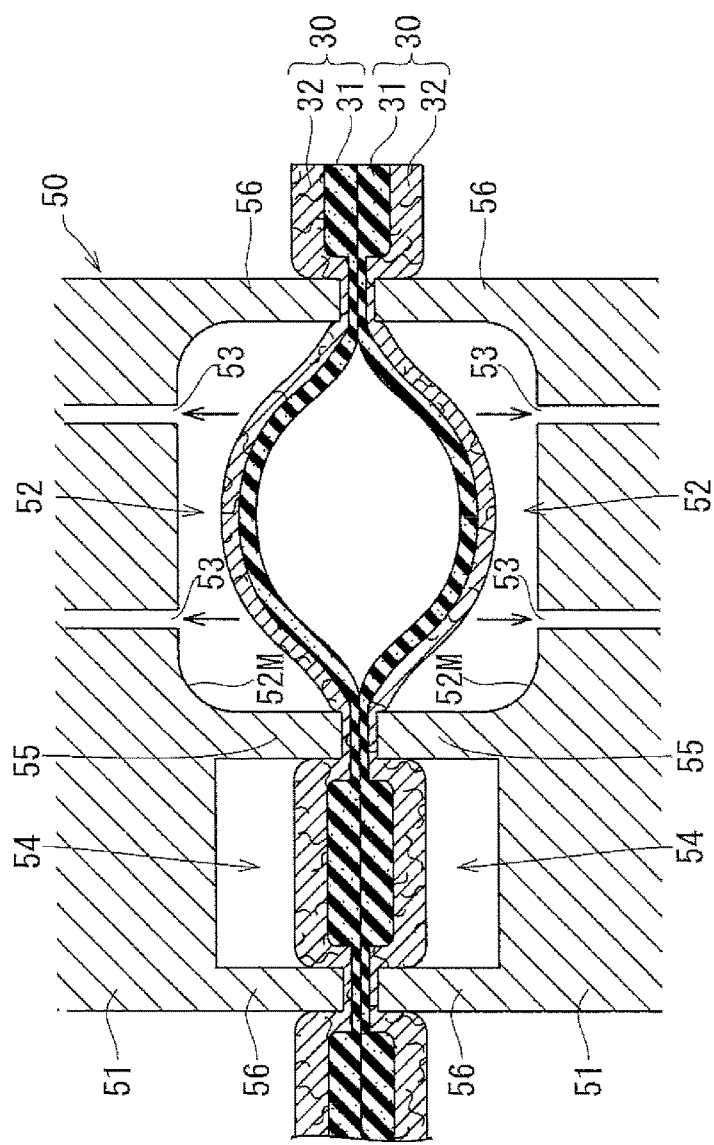
FIG. 7 is a cross-sectional view of the sound absorbing sheets and the forming mold in the middle of vacuum molding.

When the pair of sound absorbing sheets 30, 30 are set in the forming mold 50, as shown in FIG. 7, the forming mold 50 is closed. Then, the pair of divided molds 51, 51 are brought close to each other, and the outer periphery protruding wall 56 and the partition protruding wall 55 sandwich part of the sound absorbing sheets 30, 30. Here, the area of the sound absorbing sheet 30 is larger than the area of the opposing face 51M of the divided mold 51, and thus the sound absorbing sheet 30 is extended outward of the outer periphery protruding wall 56 of the divided mold 51. The depths of the first recess portion 52 and the second recess portion 54 are respectively greater than the thickness of the sound absorbing sheet 30. When the forming mold 50 is closed, part of the sound absorbing sheet 30 arranged within the first recess portion 52 and part of the sound absorbing sheet 30 arranged within the second recess portion 54 are prevented from being compressed in the thickness direction by the pair of divided molds 51, 51.

Then, the air within the first recess portion 52 is sucked from the suction ports 53 of the forming mold 50, and vacuum molding is performed. Consequently, the part of the pair of sound absorbing sheets 30, 30 arranged within the first recess portions 52, 52 is separated as shown in FIG. 7. The non-woven fabric layers 32 of the respective sound absorbing sheets 30 are pressed onto the molding surfaces 52M and is molded. Here, the part of the sound absorbing sheets 30, 30 which is sandwiched by the outer periphery protruding wall 56 and the partition protruding wall 55 is crimped by the outer periphery protruding wall 56 and the partition protruding wall 55, and thus the sound absorbing sheets 30, 30 are joined.

Figure 8:
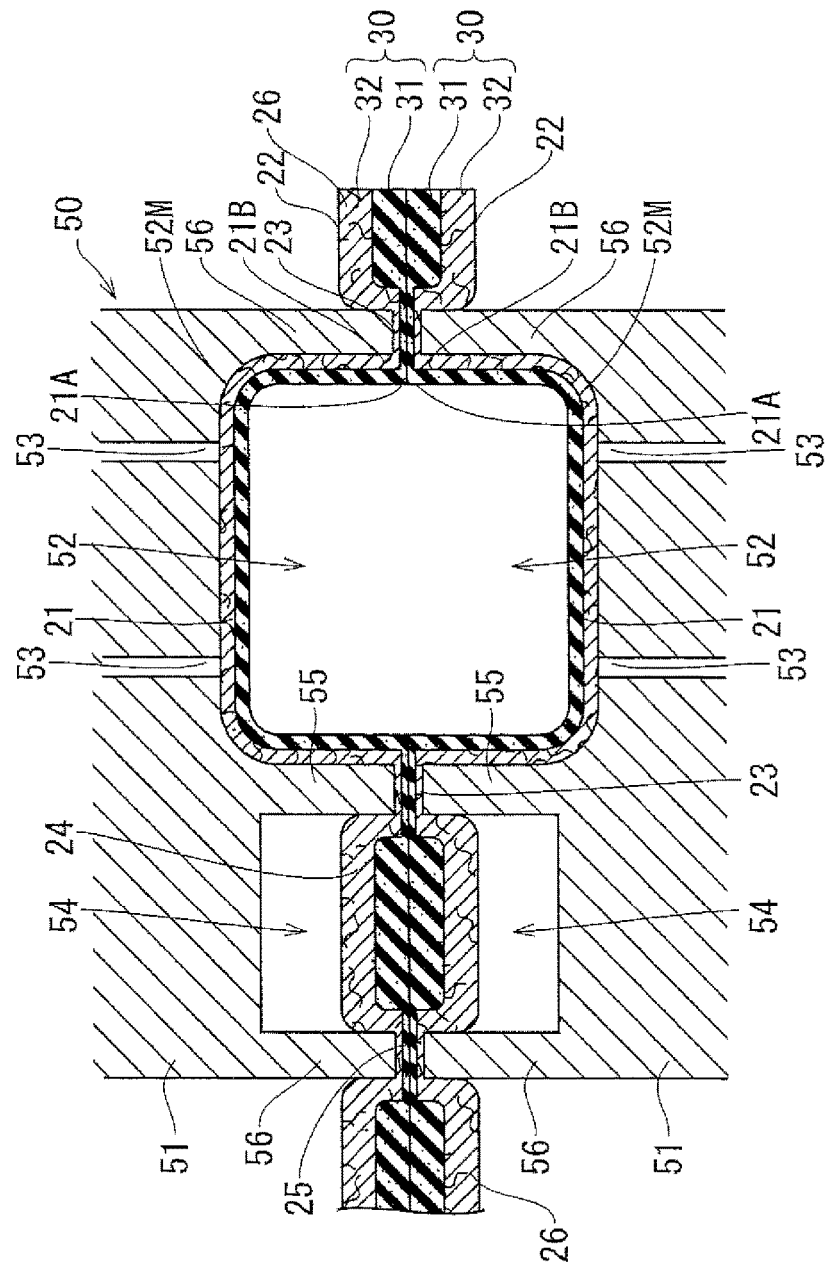
FIG. 8 is a cross-sectional view of the sound absorbing sheets and the forming mold after the vacuum molding.
Figure 9:
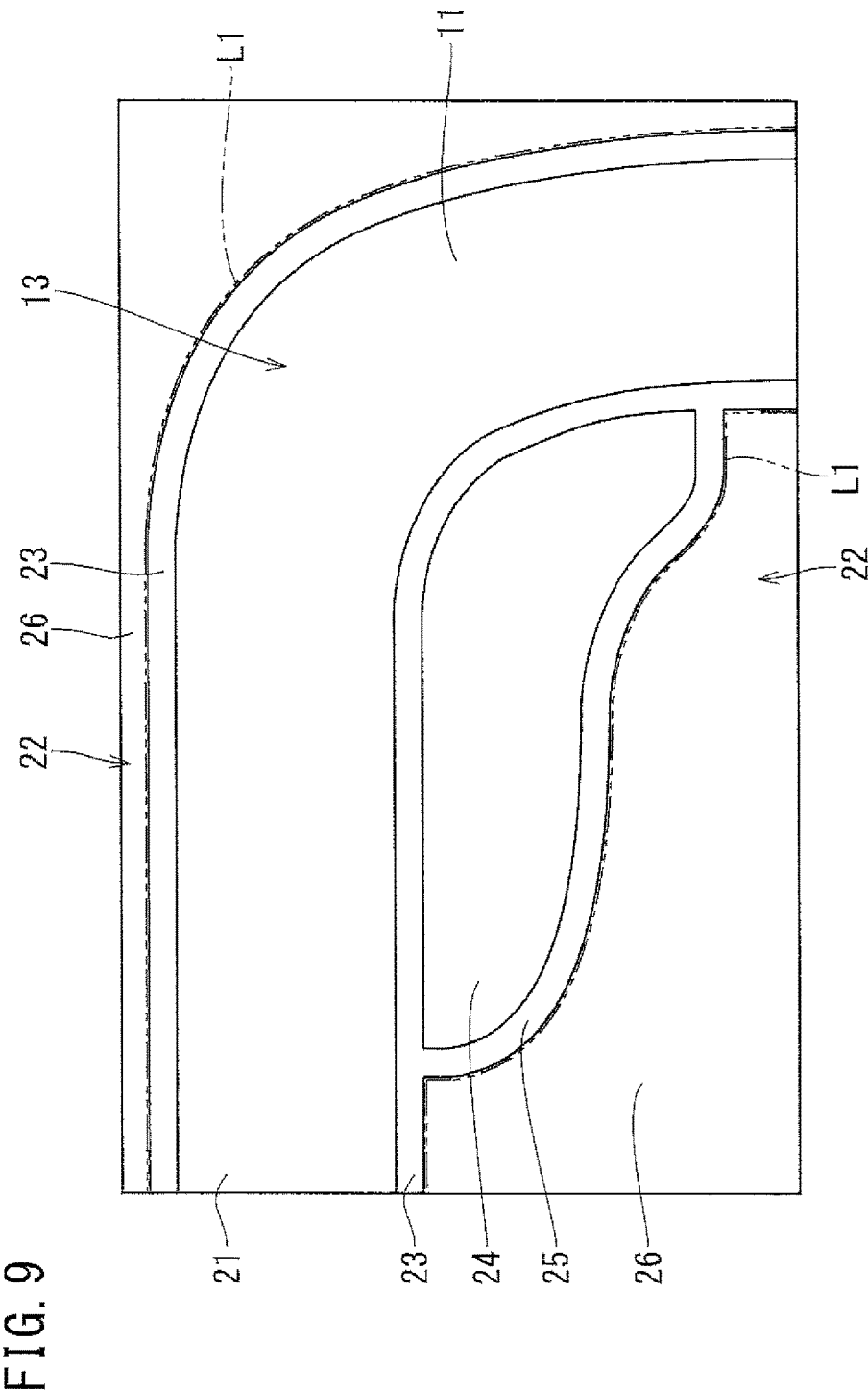
FIG. 9 is a plan view of a groove-shaped member before being trimmed.

When the vacuum molding of the respective sound absorbing sheets 30 is completed, the respective sound absorbing sheets 30 are molded in the shape of grooves to form the groove-shaped members 21 (see FIG. 4) as shown in FIG. 8. and the seal portion 23 and the outer crimped portion 25 are formed in the part of the flange portions 22, 22 of the pair of groove-shaped members 21, 21 sandwiched by the outer periphery protruding walls 56, 56 and in the part sandwiched by the partition protruding walls 55, 55. Here, the part of the pair of sound absorbing sheets 30, 30 that is arranged within the second recess portions 54, 54 is left without being compressed in the thickness direction, and forms the outer thick portion 24. Furthermore, part of the pair of sound absorbing sheets 30, 30 that is extended outward of the divided molds 51 is also left without being compressed in the thickness direction, and forms an end edge thick portion 26.

The pair of groove-shaped members 21, 21 joined to each other are taken out of the forming mold 50, and the outer edge portions of the pair of flange portions 22, 22 are trimmed. Here, the pair of flange portions 22, 22 are trimmed along, for example, a cutting line L1 indicated by a two-dot chain line in FIG. 9, and the entire of the end edge thick portion 26 is cut from the pair of flange portions 22, 22. As described above, in the method of manufacturing the duct 10 according to the present embodiment, it is possible to form the outer thick portion 24 by utilization of the sound absorbing sheet 30 to be cut from the pair of flange portions 22, 22 when the pair of flange portions 22, 22 are trimmed along the seal portion 23. As a result that the sound absorbing sheet 30 is effectively utilized. In this way, the duct 10 shown in FIG. 2 is completed.

The structure of the duct 10 and the method of manufacturing the duct 10 in the present embodiment have been described above. The actions and effects of the duct 10 and the method of manufacturing the same will then be described.

In the duct 10 according to the present embodiment, the joining of the pair of flange portions 22, 22 in the pair of groove-shaped members 21, 21 is performed in the seal portion 23 which is formed by crimping the sound absorbing sheets 30, 30 in a part of the flange portion 22 along the groove opening edge 21B, and the outer thick portion 24 which is formed of the sound absorbing sheet 30 thicker than the sound absorbing sheet 30 of the seal portion 23 is provided externally of the seal portion 23. In the duct 10 described above, the part of the sound absorbing sheet 30 that is thicker than the sound absorbing sheet 30 of the seal portion 23 is present in the pair of flange portions 22, 22, and thus it is possible to enhance the sound absorbing performance of the duct 10 as compared with the conventional duct which has a structure where the pair of flange portions 22, 22 are formed only with the seal portion 23. Moreover, in the method of manufacturing the duct 10 of the present embodiment, it is possible to form the outer thick portion 24 by utilization of the sound absorbing sheet 30 cut from the pair of flange portions 22, 22 when the pair of flange portions 22, 22 is trimmed along the seal portion 23. As a result that the sound absorbing sheet 30 is effectively utilized. The sound absorbing sheet 30 of the duct wall 11 is compressed in the thickness direction in the duct 10. On the other hand, the sound absorbing sheet 30 of the outer thick portion 24 is thicker than the sound absorbing sheet 30 of the duct wall 11, and thus it is possible to compensate for the deterioration of the sound absorbing performance of the sound absorbing sheet 30 of the duct wall 11 with the outer thick portion 24.

Since in the duct 10 of the present embodiment, the outer crimped portion 25 formed by crimping the sound absorbing sheets 30, 30 is provided in the outer edge portions of the pair of flange portions 22, 22, the separation of the outer edge portions of the pair of flange portions 22, 22 from each other is suppressed. In this way, it is possible to improve the appearance of the duct 10, and the catching of the sound absorbing sheet 30 in another device or a member provided on the back side of the instrument panel 91 (see FIG. 1) is suppressed. Furthermore, since in the method of manufacturing the duct 10 according to the present embodiment, the trimming is performed along the outer crimped portion 25 formed by crimping the sound absorbing sheets 30, 30, it is possible to easily perform the trimming operation.

Furthermore, since in the duct 10 of the present embodiment, the outer thick portion 24 is formed inside the corner portion 13, the duct 10 is made compact. Moreover, an increase in the area of the sound absorbing sheet 30 for forming the outer thick portion 24 is suppressed, and thus it is possible to enhance the yield of the duct 10.

Confirmatory Experiment

A difference in sound absorbing performance between the part constituting the duct wall 11 and the seal portion 23 and the part constituting the outer thick portion 24 in the sound absorbing sheet 30 was confirmed by an experiment. Specifically, a reverberant sound absorption coefficient was measured according to a method prescribed in JIS A1409. The details of the experimental conditions and the results of the experiment are as follows.

Experimental Conditions

First, sound was emitted from a speaker within a reverberation room where there was no test specimen. Then, the emission of the sound was stopped, and then the decay process of the sound was measured with a microphone. Then, a reverberation time T1 until the sound decayed by 60 dB was determined from a measured decay curve. Then, in a state in which the test specimen was placed on the floor surface of the reverberation room, the decay process of the sound was likewise measured, and thus a reverberation time T2 was determined. Then, a sound absorption coefficient was calculated based on the reverberation times T1 and T2. In Experimental Example 1, as the test specimen, the sound absorbing sheet 30 (sheet thickness of 8 to 10 mm) constituting the outer thick portion 24 (see FIG. 4) of the duct 10 was used. In Experimental Example 2, as the test specimen, the sound absorbing sheet 30 (sheet thickness of 3 to 5 mm) constituting the duct wall 11 and the seal portion 23 (see FIG. 4) of the duct 10 was used. The area of the specimen in each of the Experimental Examples was set at 1 m². Specifically, in Experimental Example 1, a plurality of outer thick portions 24 cut from a plurality of ducts 10 were connected in a planar shape and then were used. In experimental Example 2, the duct walls 11 and the seal portions 23 cut from a plurality of ducts 10 were connected in a planar shape and then were used. In the sound absorbing sheet 30 used in this experiment, the closed-cell layer 31 was formed of a foam polyethylene sheet and the non-woven fabric layer 32 was formed of a PET non-woven fabric sheet.

Experimental Results

Figure 10:
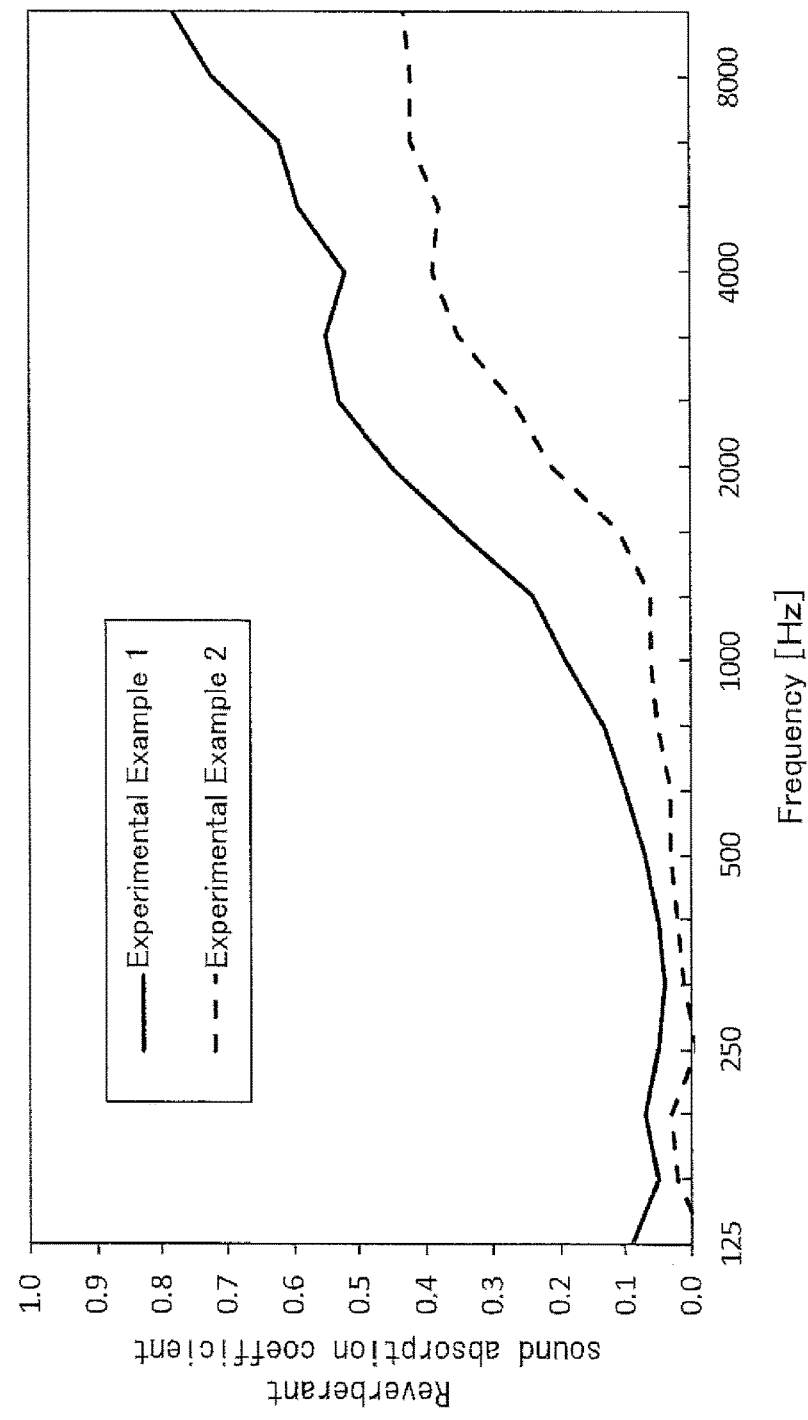
FIG. 10 is a graph showing the results of a confirmatory experiment.

FIG. 10 shows a graph in which sound absorption coefficients in Experimental Examples 1 and 2 are plotted with respect to frequencies. As shown in the figure, it is found that frequency characteristics in Experimental Examples 1 and 2 are similar and that in each of Experimental Examples 1 and 2, the sound absorption coefficient is increased as the frequency becomes higher. It is also found that in the range of the frequencies measured in this experiment, the sound absorption coefficient is greater in Experimental Example 1 than in Experimental Example 2 over the entire frequencies. Hence, it is confirmed that the sound absorbing sheet 30 of the outer thick portion 24 is higher in sound absorbing performance than the sound absorbing sheet 30 of the duct wall 11 and the seal portion 23.

Second Embodiment

Figure 11:
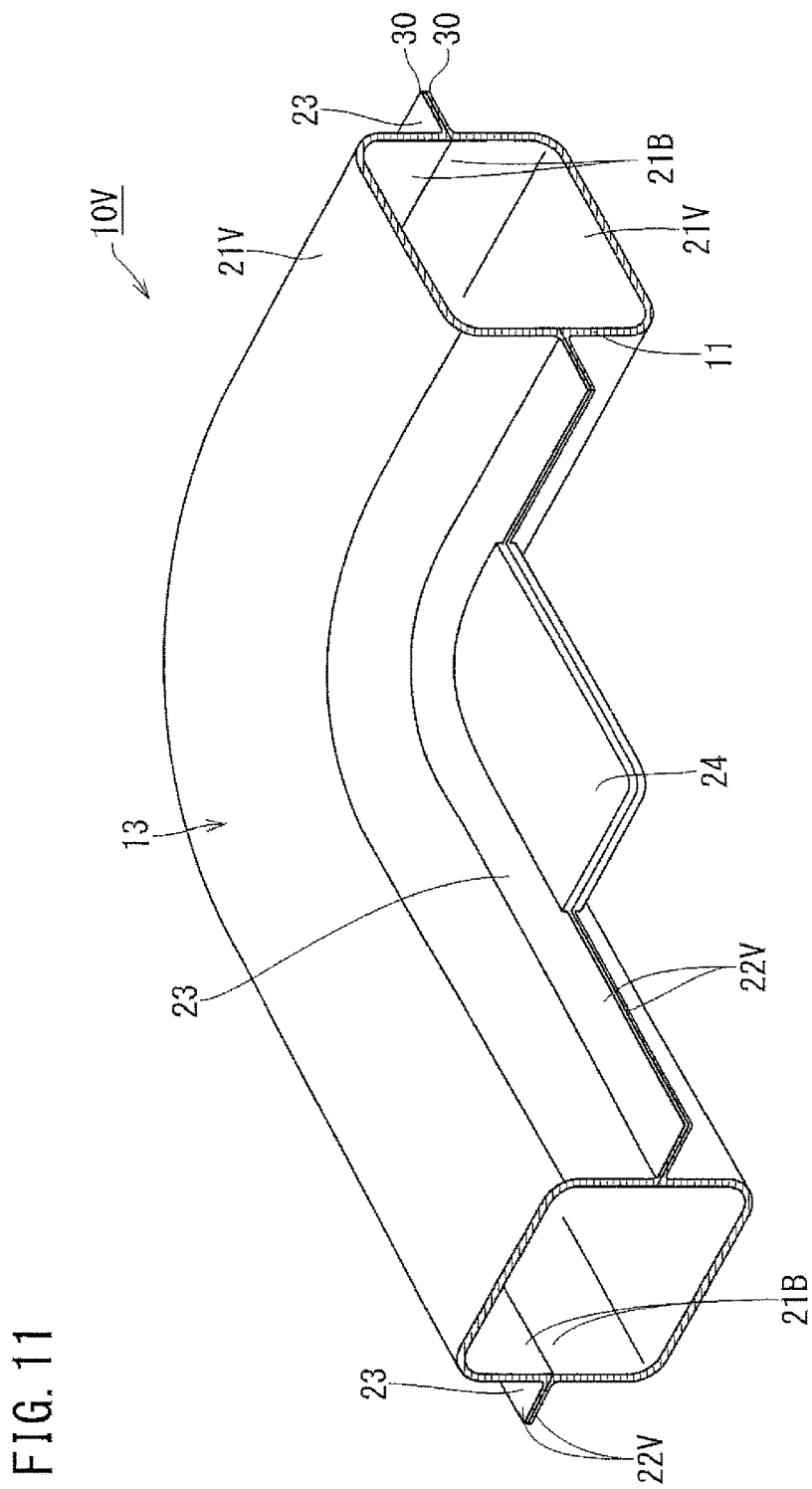
FIG. 11 is a partially broken perspective view of a duct according to a second embodiment.
Figure 12:
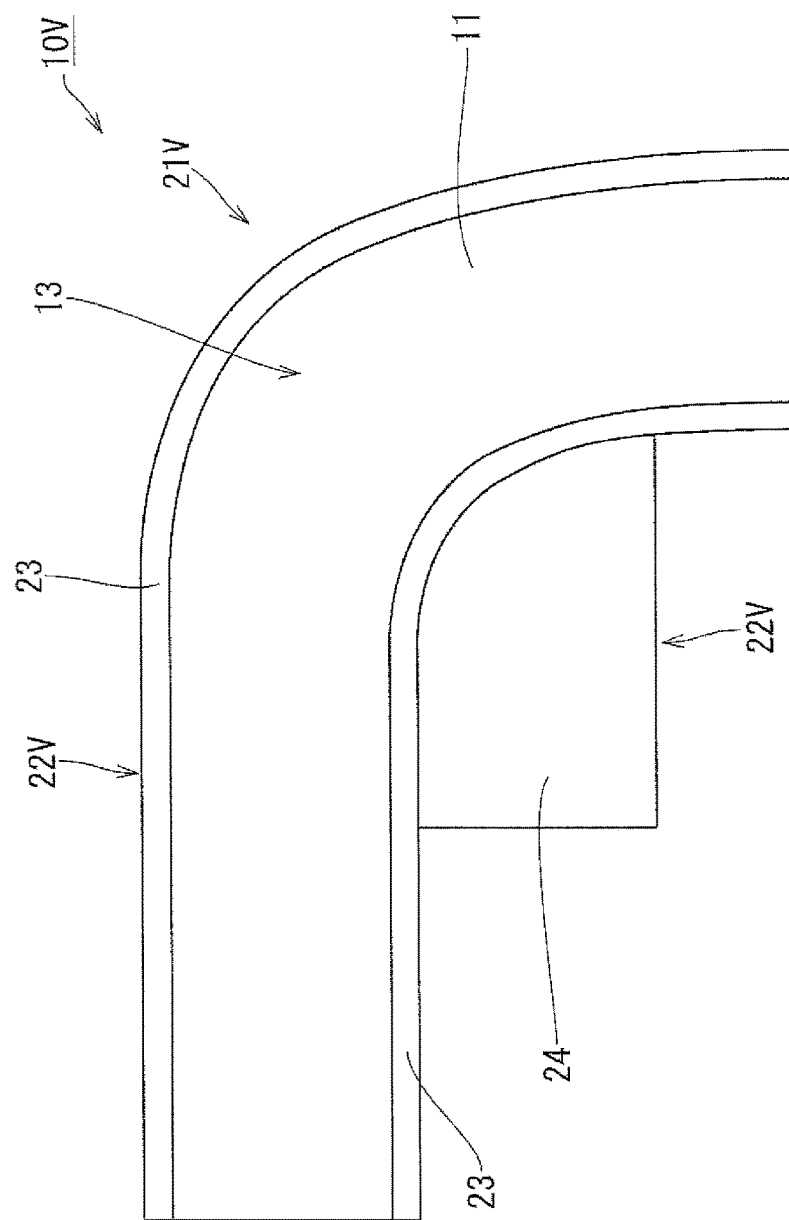
FIG. 12 is a plan view of the duct.
Figure 13:
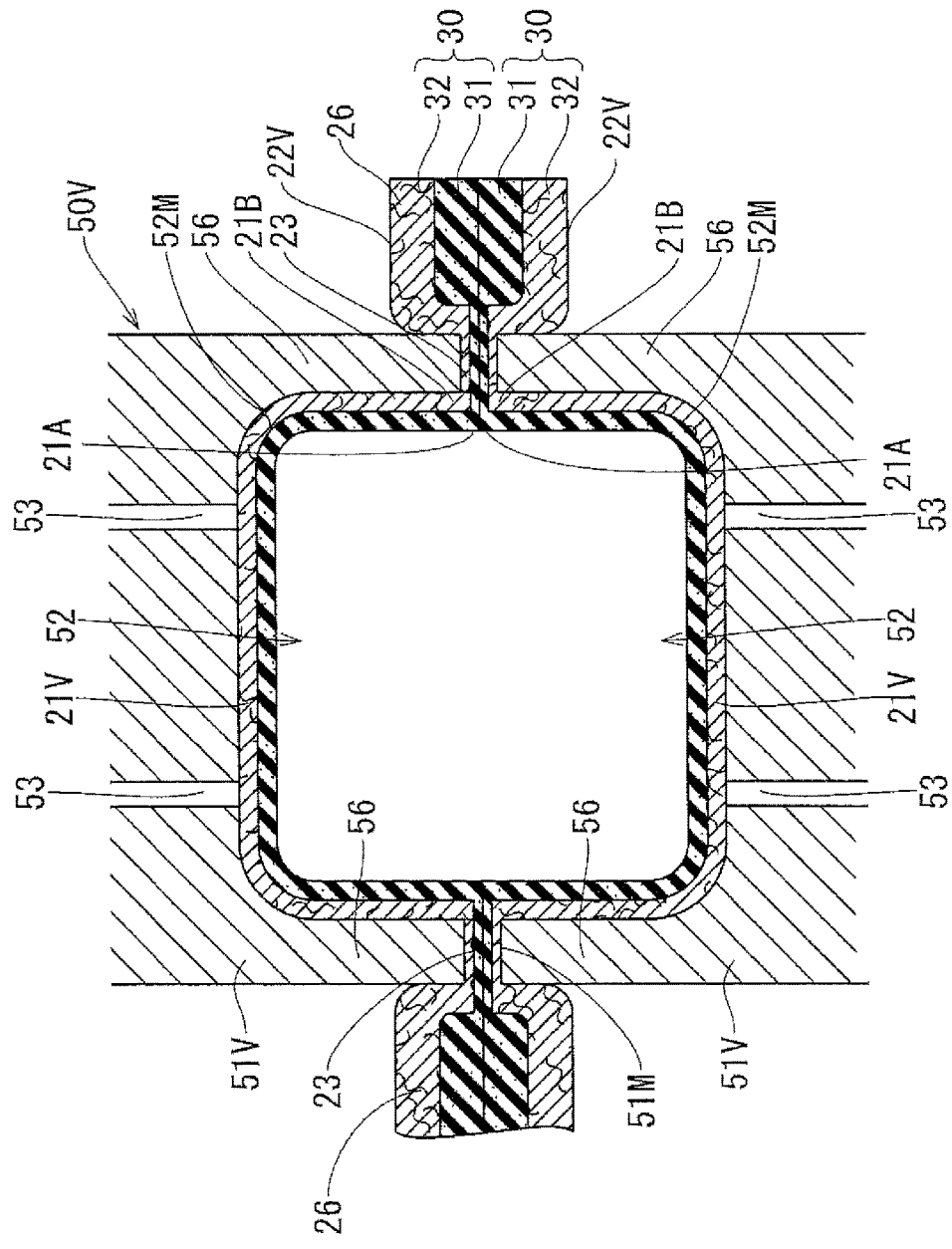
FIG. 13 is a cross-sectional view of the sound absorbing sheets and the forming mold after the vacuum molding.

A second embodiment of the present invention will be described below with reference to FIGS. 11 to 13. As shown in FIGS. 11 and 12, the duct 10V of the present embodiment is a modification of the duct of the first embodiment, and the duct 10V differs in that the outer crimped portion 25 is not included. Since the other configurations of the duct 10V are the same as those of the duct 10 in the first embodiment, they are identified with the same symbols, and the explanation will be omitted.

A method of manufacturing the duct 10V will then be described. As shown in FIG. 13, in the manufacturing of the duct 10V, a forming mold 50V formed with a pair of divided molds 51V, 51V is used. Each of the divided molds 51V differs from the divided mold 51 (see FIGS. 6 to 8) described in the first embodiment in that only the first recess portions 52 are included in the opposing faces 51M.

In order for the duct 10V to be manufactured, as in the first embodiment, the pair of sound absorbing sheets 30, 30 are set in the forming mold 50V, the forming mold 50V is closed and the sound absorbing sheets 30, 30 are vacuum molded. Then, part of the sound absorbing sheets 30 that is arranged within the first recess portions 52 is molded in the shape of grooves to form groove-shaped members 21V, 21V. The seal portion 23 is formed by crimping the part of the pair of flange portions 22V, 22V of the pair of groove-shaped members 21V, 21V that is sandwiched by the outer periphery protruding walls 56, 56 of the pair of divided molds 51V, 51V. Here, the part of the sound absorbing sheets 30, 30 that is extended outward of the outer periphery protruding walls 56, 56 in the pair of divided molds 51V, 51V forms the end edge thick portion 26.

When the vacuum molding is completed, the pair of groove-shaped members 21V, 21V are taken out of the forming mold 50V, and the pair of flange portions 22V, 22V are trimmed. The trimming is performed such that part of the end edge thick portion 26 (see FIG. 9 in the first embodiment) is left, and the left end edge thick portion 26 forms the outer thick portion 24 which is extended outward from the seal portion 23. In this way, the duct 10V shown in FIG. 11 has been completed.

With the duct 10V and the method of manufacturing the duct 10V of the present embodiment, it is possible to achieve the same effects as in the first embodiment. In the example of the present embodiment, as shown in FIGS. 11 and 12, the outer thick portion 24 is formed substantially in the shape of a quadrangle inside the corner portion 13. However, the outer thick portion 24 may be formed in shape of an arc along the seal portion 23 or may be formed in the same shape as in the first embodiment.

Other Embodiments

The present invention is not limited to the aforementioned embodiments. Embodiments which will be described below, for example, are also included in the technical scope of the present invention. Furthermore, in addition to the following embodiments, various modifications are possible without departing from the spirit of the present invention.

(1) Although in the embodiments discussed above, the example where the present invention is applied to the air conditioning duct of the vehicle 90 is described, the present invention is not limited to this application. The present invention may be applied to a duct for cooling the battery of the vehicle 90 for example. The present invention is also not limited to a duct for a vehicle.

(2) Although in the embodiments described above, the sound absorbing sheet 30 has the layered structure of the closed-cell layer 31 and the non-woven fabric layer 32, a layered structure may be adopted in which it is formed of an open-cell layer using a foam sheet having an open-cell structure instead of the closed-cell layer 31, and the non-woven fabric layer 32. A single-layer structure may be simply adopted which has only the closed-cell layer 31 or the open-cell layer.

(3) Although in the embodiments described above, the duct 10 or 10V is formed to have the corner portion 13, the duct 10 or 10V may be formed straight. In this case, the pair of flange portions 22, 22 of the pair of groove-shaped members 21, 21 does not need to be trimmed after vacuum molding. Specifically, the end edge thick portion 26 (see FIGS. 8 and 9) formed of the parts of the sound absorbing sheets 30, 30 extended outward from the outer periphery protruding walls 56 of the divided molds 51 serves as the outer thick portion 24 without being processed.

Figure 14:
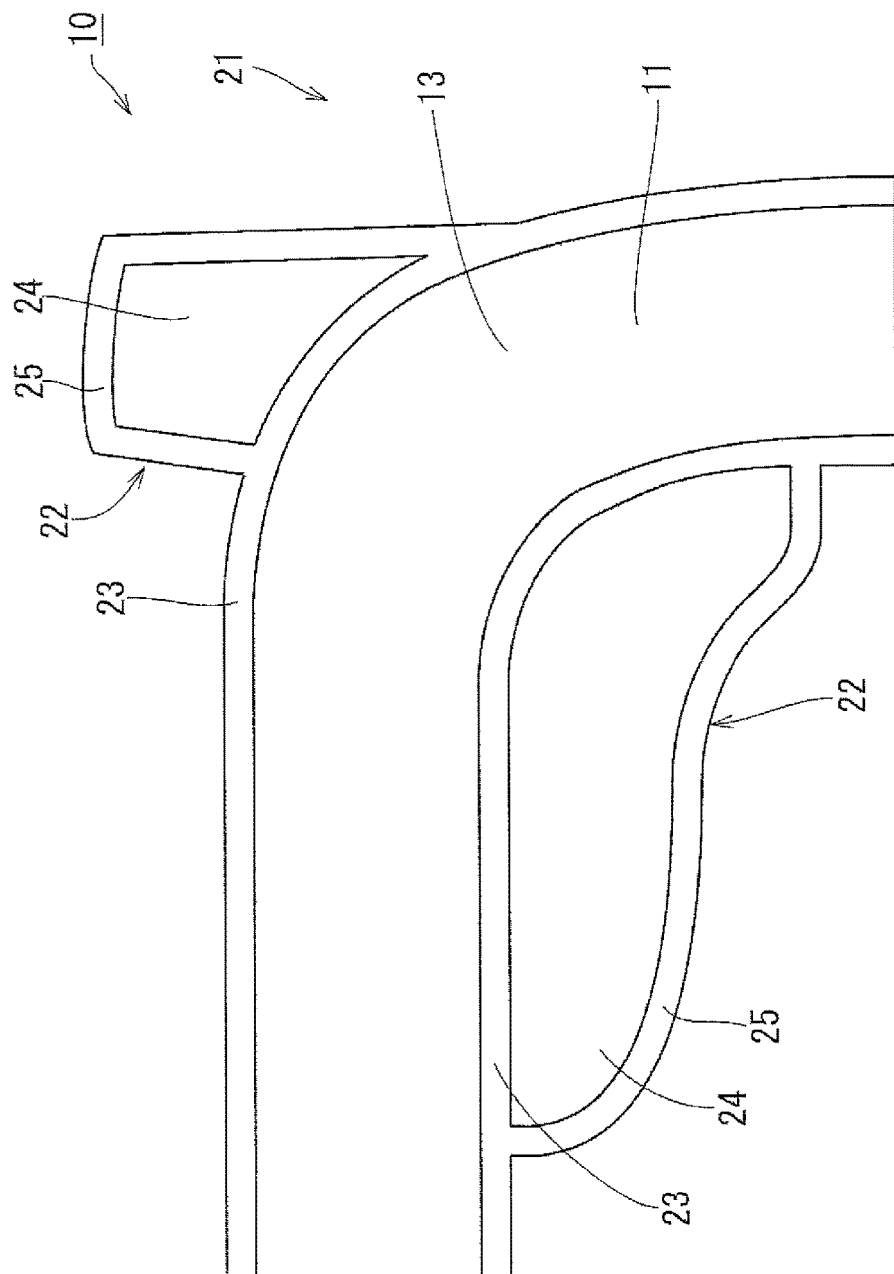
FIG. 14 is a plan view of a duct according to a variation.

(4) Although in the embodiments described above, the outer thick portion 24 is provided inside the corner portion 13 in the duct 10, as shown in FIG. 14, it may be provided outside the corner portion 13 (FIG. 14 shows a variation of the duct 10 in the first embodiment). Although FIG. 14 shows the variation in which the outer thick portion 24 is provided both inside and outside the corner portion 13, the outer thick portion 24 may be provided only outside the corner portion 13.

Figure 15:
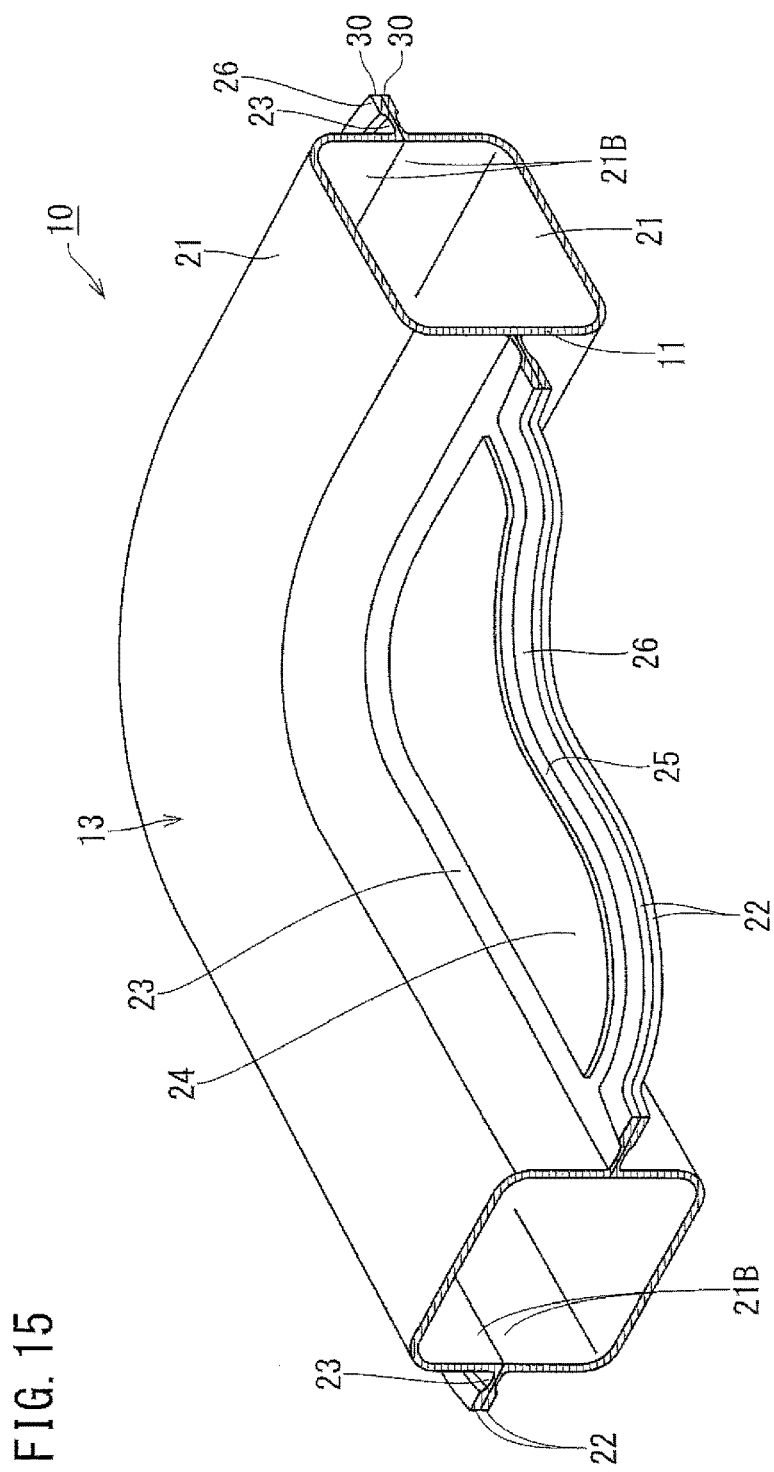
FIG. 15 is a partially broken perspective view of the duct according to the variation.

(5) Although in the first embodiment described above, the entire end edge thick portion 26 is cut when the pair of flange portions 22, 22 are trimmed, part of the end edge thick portion 26 may be left. In this case, as shown in FIG. 15, in the pair of flange portions 22, 22, the end edge thick portion 26 is provided separately from the outer thick portion 24. In this case, the end edge thick portion 26 also constitutes the "outer thick portion" of the present invention. Although in the example of FIG. 15, the end edge thick portion 26 is provided both inside and outside the corner portion 13 of the duct 10, the end edge thick portion 26 may be provided only either inside or outside the corner portion 13. In the structure in which the end edge thick portion 26 is provided only inside the corner portion 13, the duct 10 is made compact.

(6) Although in the first embodiment described above, the groove-shaped members 21 are vacuum molded, the groove-shaped members 21 may be molded by pressure molding in which air is fed between the pair of sound absorbing sheets 30, 30 sandwiched by the pair of divided molds 51, 51 or the groove-shaped members 21 may be molded by performing the vacuum molding and the pressure molding at the same time. This method may be applied to the second embodiment.

(7) Although in the embodiments described above, the pair of sound absorbing sheets 30, 30 are adhered to each other in the outer thick portion 24, a space may be provided between both the sound absorbing sheets 30, 30. In that case, the space between the pair of sound absorbing sheets 30, 30 of the outer thick portion 24 may be hermetically sealed with the outer crimped portion 25 and the seal portion 23.

DESCRIPTION OF THE REFERENCE NUMERAL 10, 10V Duct
11 Duct wall
13 Corner portion
21, 21V Groove-shaped member
22, 22V Flange portion
23 Seal portion
24 Outer thick portion
25 Outer crimped portion
26 End edge thick portion
30 Sound absorbing sheet
31 Closed-cell layer
32 Non-woven fabric layer

The invention claimed is:

1. A duct comprising:
a pair of groove-shaped members formed of sound absorbing sheets; and
a pair of flange portions formed of parts of the pair of groove-shaped members extending outward from groove opening edges and joined in an overlaid state on each other when the pair of groove-shaped members are arranged such that groove openings are opposed to each other,
the pair of flange portions including:
a seal portion formed by crimping the sound absorbing sheets in parts of the flange portions along the groove opening edges;
an outer thick portion extending outward from the seal portion and formed of the sound absorbing sheet thicker than the sound absorbing sheet of the seal portion; and
an outer crimped portion extending outward from the outer thick portion, the outer crimped portion formed by crimping the sound absorbing sheets along an outer edge of the outer thick portion.

2. The duct according to claim 1, wherein:
at least one of the sound absorbing sheets located on a duct wall of the duct is compressed in a thickness direction, and
the sound absorbing sheets on the outer thick portion is thicker than the sound absorbing sheets on the duct wall.

3. The duct according to claim 2,
wherein the outer thick portion is sandwiched between the outer crimped portion and the seal portion.

4. The duct according to claim 1,
wherein the outer thick portion is sandwiched between the outer crimped portion and the seal portion.

5. The duct according to claim 1, wherein:
in the duct, a corner portion which is curved within a surface parallel to a junction surface of the pair of groove-shaped members is provided, and
the outer thick portion is arranged inside the corner portion.

6. The duct according to claim 1,
wherein the sound absorbing sheets are laminated sheets, each including a closed-cell layer which is formed of a closed-cell member and a non-woven fabric layer which is formed of a non-woven fabric, and the sound absorbing sheets are arranged such that the closed-cell layer faces inward of the duct.

7. A method of manufacturing a duct comprising:
forming a pair of sound absorbing sheets obtained by overlaying the pair of sound absorbing sheets, with at least one of molding methods of vacuum molding and pressure molding, into a shape of a groove so as to form a pair of groove-shaped members; and
joining a pair of flange portions which are extended outward from groove opening edges of the pair of groove-shaped members, the joining of the pair of flange portions including:
crimping the pair of sound absorbing sheets in parts of the pair of flange portions along the groove opening edges so as to form a seal portion as a junction of the pair of flange portions;
forming an outer thick portion which is extended outward from the seal portion and which is formed of the pair of sound absorbing sheets, the pair of sound absorbing sheets being thicker at the outer thick portion than at the seal portion; and
crimping the pair of sound absorbing sheets along an outer edge of the outer thick portion, the crimping of the pair of sound absorbing sheets forming an outer crimped portion extending outward from the outer thick portion; and
trimming the pair of flange portions such that at least a part of the outer thick portion remains.

8. The method according to claim 7, wherein:
the crimping of the pair of sound absorbing sheets sandwiches the outer thick portion with the seal portion, and
joining the pair of flange portions includes trimming the pair of flange portions along the outer crimped portion.

9. The method according to claim 8 further comprising:
forming the pair of groove-shaped members into a shape to include a corner portion curved within a surface parallel to a junction surface of the pair of groove-shaped members; and
forming the outer thick portion in parts of the pair of flange portions located inward of the corner portion.

10. The method according to claim 7 further comprising:
forming the pair of groove-shaped members into a shape to include a corner portion curved within a surface parallel to a junction surface of the pair of groove-shaped members; and
forming the outer thick portion in parts of the pair of flange portions located inward of the corner portion.

* * * * *